(12) United States Patent
An et al.

(10) Patent No.: US 11,169,406 B2
(45) Date of Patent: Nov. 9, 2021

(54) TOUCH AND DISPLAY DRIVER INTEGRATED ASSEMBLY INCLUDING PROTECTIVE LAYERS, METHOD OF MANUFACTURING THE SAME, AND ELECTRONIC APPARATUS

(71) Applicants: Beijing BOE Optoelectronics Technology Co., Ltd., Beijing (CN); BOE TECHNOLOGY GROUP CO., LTD., Beijing (CN)

(72) Inventors: Yang An, Beijing (CN); Jiapeng Li, Beijing (CN); Shenghui Wang, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/639,953

(22) PCT Filed: Mar. 28, 2019

(86) PCT No.: PCT/CN2019/080135
§ 371 (c)(1),
(2) Date: Feb. 18, 2020

(87) PCT Pub. No.: WO2019/184988
PCT Pub. Date: Oct. 3, 2019

(65) Prior Publication Data
US 2020/0249513 A1    Aug. 6, 2020

(30) Foreign Application Priority Data

Mar. 28, 2018   (CN) .......................... 201810265713.9
Jun. 5, 2018    (CN) .......................... 201810567379.2

(51) Int. Cl.
*G06F 3/044*    (2006.01)
*G02F 1/1333*   (2006.01)
(Continued)

(52) U.S. Cl.
CPC ........ *G02F 1/13338* (2013.01); *G02F 1/1368* (2013.01); *G02F 1/136286* (2013.01);
(Continued)

(58) Field of Classification Search
CPC ...... G06F 1/1643; G06F 1/169; G06F 1/1692; G06F 3/03547; G06F 3/041–0428;
(Continued)

(56) References Cited

U.S. PATENT DOCUMENTS 9,046,955 B1   6/2015  Lee et al.
9,280,014 B2   3/2016  Du et al.
(Continued)

FOREIGN PATENT DOCUMENTS

CN    103049157 A    4/2013
CN    103219392 A    7/2013
(Continued)

OTHER PUBLICATIONS

Second Office Action, including Search Report, for Chinese Patent Application No. 201810567379.2, dated Aug. 10, 2020, 16 pages.
(Continued)

*Primary Examiner* — Sanghyuk Park
(74) *Attorney, Agent, or Firm* — Westman, Champlin & Koehler, P.A.

(57) ABSTRACT

The present disclosure relates to a touch and display driver integrated assembly, a method of manufacturing the same, and an electronic apparatus. The touch and display driver integrated assembly includes: a TFT structure layer provided on a substrate plate; a first protective layer, a first conductive layer, a plurality of first sensing signal lines, and a second
(Continued)

protective layer, sequentially arranged above the TFT structure layer; wherein the plurality of first sensing signal lines are on an upper surface of the first conductive layer; and the second protective layer covers a surface formed by the first sensing signal lines and the first conductive layer.

20 Claims, 3 Drawing Sheets (51) Int. Cl.
G02F 1/1362 (2006.01)
G02F 1/1368 (2006.01)
G06F 3/041 (2006.01)
G06F 3/047 (2006.01)

(52) U.S. Cl.
CPC ............ G06F 3/047 (2013.01); G06F 3/0412 (2013.01); *G06F 2203/04103* (2013.01)

(58) Field of Classification Search
CPC .......... G06F 3/0488–04886; G06F 2200/1634; G06F 2203/0339; G06F 2203/04101; G06F 2203/04103–04113; G06F 2203/04809
See application file for complete search history.

(56) References Cited

U.S. PATENT DOCUMENTS

| | | | |
|---|---|---|---|
| 9,536,913 | B2 | 1/2017 | Lee et al. |
| 9,612,694 | B2 | 4/2017 | Tung |
| 9,746,728 | B2 | 8/2017 | Zhang et al. |
| 9,804,720 | B2 | 10/2017 | Liu |
| 9,817,503 | B2 | 11/2017 | Lin et al. |
| 10,061,416 | B2 | 8/2018 | Zhu et al. |
| 10,326,024 | B2 | 6/2019 | Meng et al. |
| 10,705,654 | B2 | 7/2020 | Kim et al. |
| 2012/0295071 | A1* | 11/2012 | Sato et al. ................. 428/18 |
| 2015/0009422 | A1 | 1/2015 | Tung |
| 2015/0185570 | A1 | 7/2015 | Zhang et al. |
| 2015/0370114 | A1 | 12/2015 | Du et al. |
| 2015/0372028 | A1 | 12/2015 | Lee et al. |
| 2016/0141424 | A1 | 5/2016 | Meng et al. |
| 2016/0240560 | A1 | 8/2016 | Lin et al. |
| 2016/0274693 | A1 | 9/2016 | Liu |
| 2016/0313837 | A1 | 10/2016 | Zhu et al. |
| 2017/0003786 | A1 | 1/2017 | Kim et al. |
| 2017/0271381 | A1* | 9/2017 | Sone ................... H01L 27/1288 |
| 2018/0046325 | A1 | 2/2018 | Kim et al. |
| 2018/0122864 | A1* | 5/2018 | Lee ........................ G06F 3/0443 |
| 2018/0150167 | A1* | 5/2018 | Hong .................... G06F 3/0445 |
| 2019/0012022 | A1* | 1/2019 | Ye .......................... G06F 3/0412 |
| 2019/0022978 | A1* | 1/2019 | Kim et al. ............. B32B 15/08 |
| 2019/0157355 | A1* | 5/2019 | Ye .......................... H01L 27/323 |

FOREIGN PATENT DOCUMENTS

| | | |
|---|---|---|
| CN | 103472944 A | 12/2013 |
| CN | 103676386 A | 3/2014 |
| CN | 104062817 A | 9/2014 |
| CN | 104750285 A | 7/2015 |
| CN | 105226070 A | 1/2016 |
| CN | 105278187 A | 1/2016 |
| CN | 105718091 A | 6/2016 |
| CN | 105895657 A | 8/2016 |
| CN | 106033765 A | 10/2016 |
| CN | 106684124 A | 5/2017 |
| CN | 106816457 A | 6/2017 |
| CN | 107092400 A | 8/2017 |
| CN | 107728832 A | 2/2018 |
| CN | 107765489 A | 3/2018 |
| CN | 108958536 A | 12/2018 |

OTHER PUBLICATIONS

First Office Action, including Search Report, for Chinese Patent Application No. 201810567379.2, dated Mar. 13, 2020, 17 pages.
Third Office Action, including Search Report, for Chinese Patent Application No. 201810567379.2, dated Dec. 7, 2020, 13 pages.

* cited by examiner

TOUCH AND DISPLAY DRIVER INTEGRATED ASSEMBLY INCLUDING PROTECTIVE LAYERS, METHOD OF MANUFACTURING THE SAME, AND ELECTRONIC APPARATUS

CROSS-REFERENCE TO RELATED APPLICATIONS

This application is a Section 371 National Stage application of International Application No. PCT/CN2019/1080135, filed on Mar. 28, 2019, which published as WO 2019/184988, on Oct. 3. 2019, and claims priority to Chinese Patent Application No. 201810265713.9 filed on Mar. 28, 2018 and entitled "TOUCH AND DISPLAY DRIVER INTEGRATED ASSEMBLY, METHOD OF MANUFACTURING THE SAME, AND ELECTRONIC APPARATUS" and Chinese Patent Application No. 201810567379.2 entitled "TOUCH AND DISPLAY DRIVER INTEGRATED ASSEMBLY, METHOD OF MANUFACTURING THE SAME, AND ELECTRONIC APPARATUS", filed on Jun. 5, 2018, the disclosures of which are incorporated herein by reference in their entireties.

FIELD

The present disclosure relates to the technical field of touch display, and in particular to a touch and display driver assembly, a method of manufacturing the same, and an electronic apparatus.

BACKGROUND

TDDI represents Touch and Display Driver Integration. At present, the touch and display functions of smart phones are independently controlled by two chips, and the TDDI technology integrates the display driver IC and touch IC in a single-chip solution, which leads to space saving, cost reduction, while reducing circuit interference and complex stacking, improving picture quality and simplifying supply chain.

SUMMARY

The main purpose of the present disclosure is to provide a touch and display driver integrated assembly in a new structure, a method of manufacturing the same, and an electronic apparatus.

The purpose of the present disclosure and solving its technical problems are achieved by using the following technical solutions. The touch and display driver integrated assembly according to the present disclosure includes:
a thin film transistor structure layer on a substrate plate;
a first protective layer covering the thin film transistor structure layer;
a first conductive layer located on a side of the first protective layer facing away from the thin film transistor structure layer;
one or more first sensing signal lines on a side of the first conductive layer facing away from the first protective layer; and
a second protective layer covering a side of the first sensing signal line and the first conductive layer facing away from the thin film transistor structure layer.

In one embodiment, the plurality of first sensing signal lines are in direct contact with the first conductive layer to achieve electrical connection.

In one embodiment, in the aforementioned touch and display driver integrated assembly, the thin film transistor structure layer includes:
a plurality of thin film transistor structures arranged in an array;
the thin film transistor structure includes a gate electrode, an insulating layer, a second conductive layer, and a plurality of source-drain signal lines and a plurality of second sensing signal lines on a surface of the second conductive layer facing away from the substrate plate, which are sequentially stacked on the substrate plate in a direction away from the substrate plate.

In one embodiment, in the aforementioned touch and display driver integrated assembly, the first conductive layer is connected to the plurality of second sensing signal lines through via holes, respectively.

In one embodiment, the first conductive layer is connected to the source-drain signal lines or a gate line through via holes, respectively.

In one embodiment, in the aforementioned touch and display driver integrated assembly, the first protective layer is a PVX protective layer, and a thickness of the first protective layer is in the range of 4000-7000 Angstroms.

In one embodiment, in the aforementioned touch and display driver integrated assembly, the thickness of the first protective layer is 6000 Angstroms.

In one embodiment, in the aforementioned touch and display driver integrated assembly, the second protective layer is a PVX protective layer, and a thickness of the second protective layer is in the range of 2000-4000 Angstroms.

In one embodiment, in the aforementioned touch and display driver integrated assembly, the thickness of the second protective layer is 2500 angstroms.

A method of manufacturing a touch and display driver integrated assembly according to the present disclosure, the method includes:
providing a thin film transistor structure layer on a substrate plate;
sequentially providing a first protective layer, a first conductive layer, one or more first sensing signal lines and a second protective layer on the thin film transistor structure layer.

In one embodiment, in the aforementioned method of manufacturing a touch and display driver integrated assembly, the providing a thin film transistor structure layer on a substrate plate includes:
sequentially providing a gate electrode, an insulating layer, and a second conductive layer on the substrate plate through a mask process and providing a plurality of source-drain signal lines and a plurality of second sensing signal lines on a side of the second conductive layer facing away from the insulating layer.

In addition, an electronic apparatus according to the present disclosure includes: a touch and display driver integrated assembly;
the touch and display driver integrated assembly including:
a thin film transistor structure layer on a substrate plate;
a first protective layer and a first conductive layer sequentially disposed above the thin film transistor structure layer;
a plurality of first sensing signal lines disposed on an upper surface of the first conductive layer according to a predetermined rule; and
a second protective layer covering a surface formed by the first sensing signal lines and the first conductive layer.

The above description is only an overview of the technical solutions of the present disclosure. In order to understand the technical means of the present disclosure more clearly and implement them in accordance with the contents of the description, a detailed description will be made as below by reference to the preferred embodiments and the accompanying drawings of the present disclosure.

DETAILED DESCRIPTION

In order to further explain the technical means and effects adopted by the present disclosure to achieve the intended disclosure purpose, specific implementations, structures, characteristics and effects of a touch and display driver integrated assembly, a method of manufacturing the same, and an electronic apparatus according to the present disclosure are described in detail as follow with reference to the accompanying drawings and preferred embodiments. In the following description, different "one embodiment" or "an embodiment" does not necessarily mean the same embodiment. Furthermore, the particular features, structures, or characteristics in one or more embodiments may be combined in any suitable form.

In a touch and display driver integrated assembly produced by the process in the related art, an ITO film layer is disposed at the outermost layer of the assembly. This arrangement causes the ITO film layer to be easily corroded, especially in the position of the via hole, where not only is the ITO film layer easily corroded, but also the metal functional layer connected to the ITO film layer will be corroded, thereby resulting in a short life of the entire touch and display driver integrated assembly. Thus, it cannot meet the longer service life of the touch and display driver integrated assembly required by electronic equipment.

As shown in FIGS. 1-4, a touch and display driver integrated assembly according to an embodiment of the present disclosure includes: a TFT structure layer 1 on a substrate plate; a first protective layer 2 covering the TFT structure layer 1; a first conductive layer 3 on a side of the first protective layer 2 facing away from the TFT structure layer 1; a plurality of first sensing signal lines 4 located on a side of the first conductive layer 3 facing away from the first protective layer 2 and being in direct contact with the first conductive layer 3 to achieve an electrical connection; and a second protective layer 5 covering the first sensing signal lines 4 and the side of the first conductive layer 3 facing away from the TFT structure layer. In one embodiment, the first protective layer 2 may be a silicon nitride layer.

The first conductive layer 3 may be an indium tin oxide (ITO) layer.

In one embodiment, the plurality of first sensing signal lines 4 are formed on an upper surface of the first conductive layer 3, for example, are formed according to a predetermined rule on the upper surface of the first conductive layer 3 so as to have a predetermined pattern; as the first sensing signal lines 4 are arranged on the upper surface of the first conductive layer 3, and are in direct contact with the first conductive layer to realize electrical connection without via hole for connection, a manufacturing process is simplified, a number of via holes can be reduced and reliability can be improved. As the first sensing signal lines 4 do not cover the entire upper surface of the first ITO layer 3, the second protective layer 5 covers the first sensing signal lines 4 and the first conductive layer 3 such that a part of the second protective layer 5 may be in contact with the first sensing signal lines 4 and another part of it may be in contact with the upper surface of the first conductive layer 3.

Figure 4:
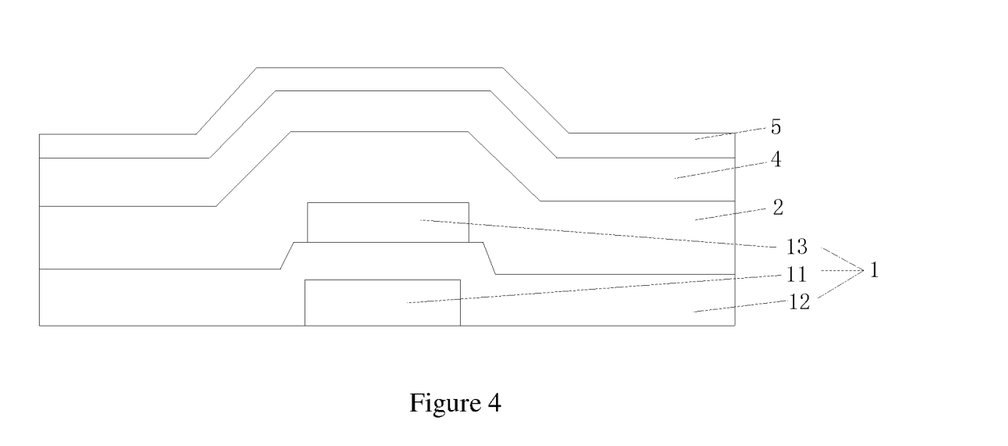
FIG. 4 is a schematic cross-sectional structural diagram of a touch and display driver integrated assembly according to an embodiment of the present disclosure.

The touch and display driver integrated assembly provided by the present disclosure is an assembly integrating a touch function and a display function of an electronic apparatus and a manufacturing method similar to that for an array substrate is adopted, that is, each functional layer or each functional structure for display and touch control are produced on a glass substrate plate by a mask process. Specifically, the substrate plate is a glass substrate plate with a predetermined thickness and a predetermined refractive index selected according to a use requirement of a specific product. A shape and size of the substrate plate can be specifically configured according to the needs of the electronic apparatus. The TFT structure layer provided on the substrate plate is formed by providing all functional structures of the TFT structure on the substrate plate in a layer-by-layer way through a mask process. The TFT structure layer mainly includes a gate layer, an insulating layer, an ITO layer for storing electrons, and source and drain signal lines (SD lines) for transmitting signals and receiving signals. The arrangement of these above main structures can directly use the design technology of a TFT array substrate in the related art in this field, which will not be repeated here; the TFT structure layer may be provided with multiple TFT structures according to specific needs, and may be further provided with other electrical connection structures and other electronic control structures according to specific needs, which is not specifically limited in this disclosure. In an actual device, a gate line can cause a protrusion of the layer on the gate line as shown in FIG. 4, that is, a step section of the layer is caused. Especially, when the SD lines for transmitting signals overlap the gate line, a greater step section is caused on the layer above them, which is prone to cause fracture.

The first protective layer disposed above the TFT structure layer is a PVX protective layer, and the thickness of the protective layer may be thicker than a conventional thickness of the protective layer above the TFT structure layer in the related art, For example, it is set as two times or more the conventional thickness of the protective layer to provide a gentle surface for the first conductive layer 3 provided above the first protective layer while achieving insulation protection, and thus to provide a bearing surface with a less step section for the first sensing signal lines 4 provided above the first conductive layer 3.

The first conductive layer 3 is disposed on the upper surface of the first protective layer 2 and is used to form, together with the ITO layer in the TFT structure, a capacitor structure for subsequent storage of electrons, achieving a potential difference from the other surface of the liquid crystal panel, and thereby controlling LCD display function.

Figure 1:
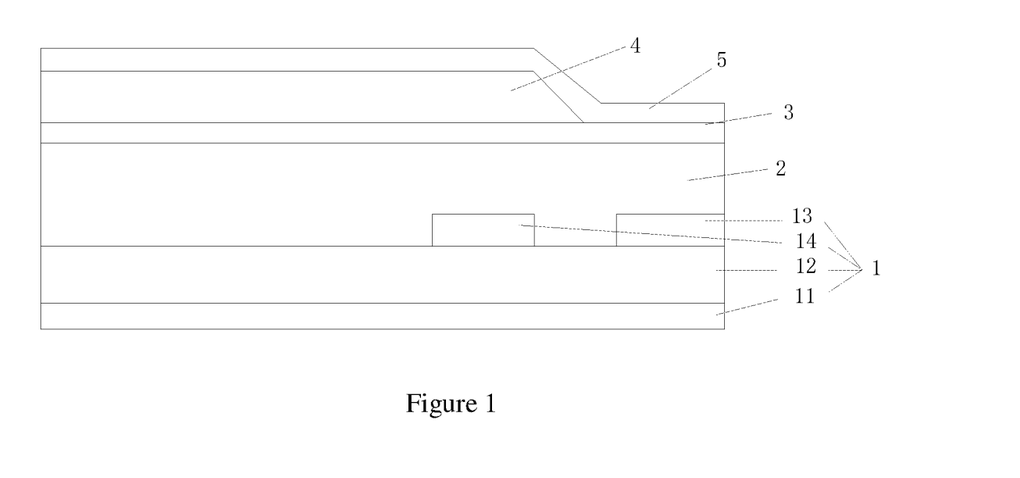
FIG. 1 is a schematic cross-sectional structural diagram of a touch and display driver integrated assembly according to an embodiment of the present disclosure.
Figure 2:
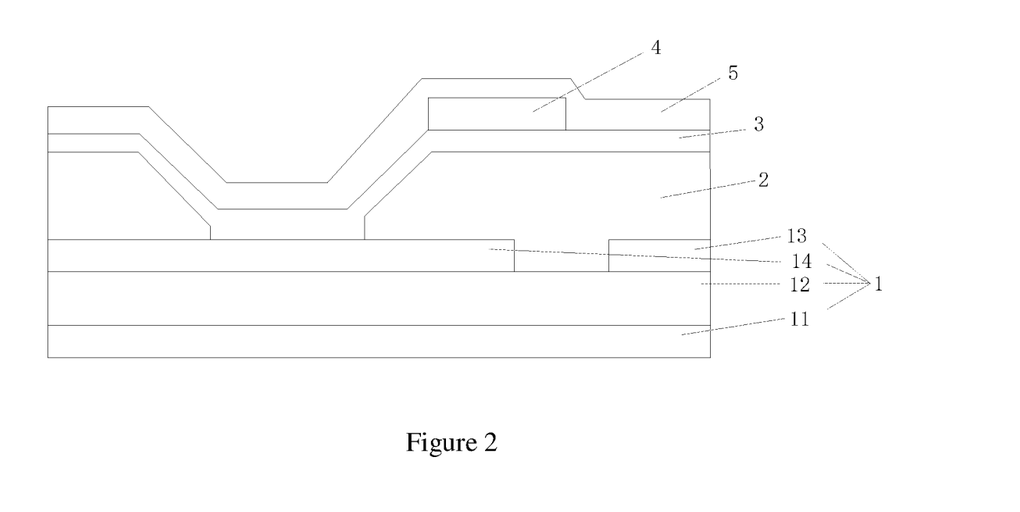
FIG. 2 is a schematic cross-sectional structural diagram of a touch and display driver integrated assembly according to an embodiment of the present disclosure.

In the embodiment of the present disclosure, the first sensing signal lines 4 are signal lines for achieving a touch function, and are directly disposed on the first conductive layer 3, that is, directly electrically connected to the first conductive layer 3, so that after the first conductive layer 3 is connected to the second sensing signal line 14 (a sensing signal line disposed in the same layer as the SD line) in the TFT structure layer (as shown in FIG. 2), the second sensing signal line 14 that is located in the TFT structure can be connected in parallel to the first sensing signal lines 4, which can be used for transmission of touch signals. The number of the first sensing signal lines 4 can be specifically set according to an overall design needs of the touch and display driver integrated assembly and may be the same as the number of the second sensing signal lines in the TFT structure layer.

The second protective layer 5 is needed to cover the entire surface of the touch and display driver integrated assembly, that is, all the devices on the surface of the substrate plate are protected by the second protective layer, so as to achieve the purpose of insulation and air and moisture isolation; the second protective layer is preferably a PVX layer, and the thickness of the second protective layer may be specifically set according to the protection level required by the touch and display driver integrated assembly.

In technical solutions of the present disclosure, the surface of the TFT structure layer of the touch and display driver integrated assembly is covered by the first protective layer 2, and then the first conductive layer 3 and the plurality of first sensing signal lines 4 are sequentially disposed on the first protective layer 2, and finally the second protective layer 5 is provided on the outermost layer of the touch and display driver integrated assembly. In the touch and display driver integrated assembly of the above structure, the surface of the first sensing signal lines 4 and the first conductive layer 3 can be covered through the setting of the second protective layer 5, and the via portion of the touch and display driver integrated assembly can be covered, thereby preventing the first sensing signal lines, the first conductive layer, and the via connection portion from contacting with air and water vapor to avoid corrosion, effectively extending the service life of the touch and display driver integrated assembly and enabling the touch and display driver integrated assembly to be used in more severe environments; the second protective layer 5 can provide a sealing protection while enable the surface of the touch and display driver integrated assembly to be configured more smoothly, and at the same time, the second protective layer may be a PVX protective layer, that is, the second protective layer 5 may have a certain elasticity, so that the touch and display driver integrated assembly obtains a certain shock resistance and a certain anti-collision performance; in addition, the first conductive layer 3 and the first sensing signal lines 4 are configured adjacent to each other such that the first conductive layer and the first sensing signal line are directly connected and thus no via hole connection is required, which eliminates one step of the production process, thereby effectively saving production costs and increasing production efficiency.

As shown in FIG. 1 to FIG. 4, in a specific implementation, the TFT structure layer 1 includes: a plurality of TFT structures arranged in an array; the TFT structure includes the gate electrode 11, the insulating layer 12, the second conductive layer (which does not exist in the illustrated part of in the integrated assembly in FIGS. 1-4 and thus is not shown), and the plurality of SD lines 13 and the second sensing signal lines 14 disposed on the upper surface of the second conductive layer, which are sequentially arranged in a direction away from the substrate plate. The second sensing signal line 14 and the SD line can be formed by forming only a single metal layer and then performing one mask exposure. The second conductive layer may be a pixel electrode layer. The second conductive layer may be an ITO layer.

It should be noted here that the functional layers and functional structures of the gate electrode 11, the insulating layer 12, the second conductive layer, and the SD lines 13 and the second sensing signal line 14 provided on the upper surface of the second conductive layer, for forming the TFT structure, should be disposed on the substrate plate in an order in consistent with the order described above. The second conductive layer is used to form a capacitor structure together with the first conductive layer 3, that is, it can be used for storing electrons and used for controlling the liquid crystal display.

As shown in FIG. 2, in a specific implementation, the first conductive layer 3 is respectively connected to the plurality of second sensing signal lines 14 through vias.

Specifically, the SD line is a communication wire for controlling the liquid crystal display by the TFT structure, and is a communication wire for a display driving part in the touch and display driver integrated assembly, and the second sensing signal lines 14 are wires used to transmit a touch signal and are needed to be arranged in parallel with the first sensing signal lines 4 to realize parallel input and output of the touch signal and the display driving signal. In this embodiment, a via hole is provided at a predetermined position of the first protective layer, such that the first conductive layer 3 extends into the via hole and is electrically connected to the second sensing signal lines 14 exposed at the bottom of the via hole.

As shown in FIGS. 1-4, in a specific implementation, the first protective layer 2 is a PVX protective layer, and the thickness of the first protective layer 2 is in a range of 4000-7000 Angstroms. For example, the thickness of the first protective layer 2 is 6000 Angstroms.

Specifically, the thickness of the first protective layer 2 provided in the present disclosure is greater than that of the protective layer of the touch and display driver integrated assembly in the conventional structure at this position such that a capacitor formed between the first conductive layer 3 and the second conductive layer satisfies for achieving a switching control function of the liquid crystal display; the thickness of the first protective layer 2 may be specifically set according to the performance requirements of the touch and display driver integrated assembly. In addition, the above thickness of the first protective layer 2 enables bending corners of the first protective layer 2 above the SD line and the second sensing signal lines 14 to become gentle such that the first conductive layer 3 and the first sensing signal lines 4 provided above the first protective layer 2 at the corresponding position also have a relatively gentle bending corner accordingly, that is, the touch and display driver integrated assembly of the present disclosure is gentler at the bending area of the first sensing signal line 4 in the hub area and the layers below are gentler than those in the device in the related art, which can effectively solve the technical problem that the first sensing signal line in the related art is prone to break, thereby ensuring continuous signal transmission and improving service life of the touch and display driver integrated assembly.

As shown in FIGS. 1-4, in a specific implementation, the second protective layer 5 is a PVX protective layer, and the thickness of the second protective layer 5 is in the range of 2000-4000 Angstroms. For example, the thickness of the second protective layer 5 is 2500 Angstroms.

Specifically, the second protective layer 5 is mainly used for the corrosion protection, as well as the shock and collision protection of the touch and display driver integrated assembly, and thus the thickness of the second protective layer 5 may be adjusted according to the needs of specific designs.

Figure 3:
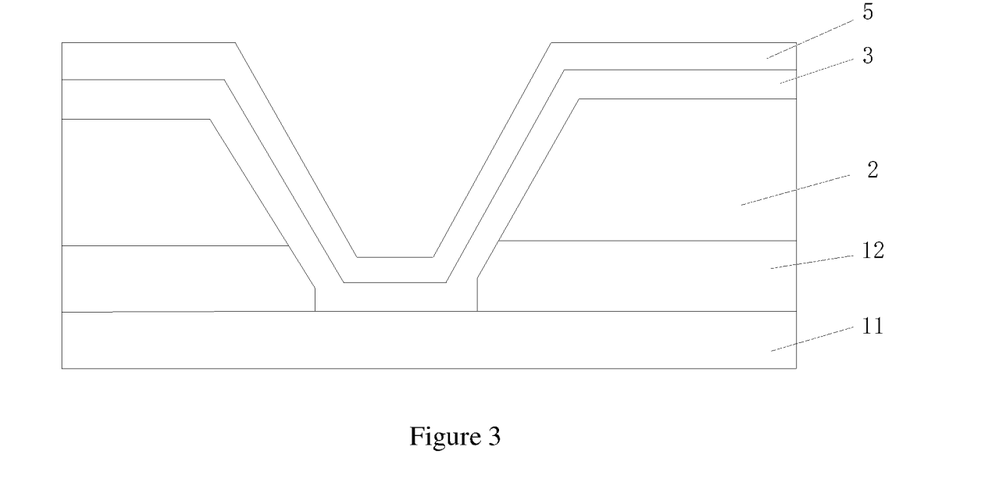
FIG. 3 is a schematic cross-sectional structural diagram of a touch and display driver integrated assembly according to an embodiment of the present disclosure.

It should be noted that, in a part of the touch and display driver integrated assembly, as shown in FIG. 3, there is no metal wire such as an SD line, and the first protective layer 2 is located on the insulating layer 12, the first conductive layer 3 is located on the first protective layer 2, and the second protective layer 5 is located on the first conductive layer 3; a via hole is formed in the first protective layer 2 and the via hole reaches the insulating layer 12 or passes through the insulating layer 12 and the first conductive layer 3 is formed in the via hole so as to be electrically connected to the SD line on the insulating layer, or be electrically connected to the gate electrode 11. It should be noted here that FIG. 3 only shows a portion where the first conductive layer 3 and the gate electrode 11 are electrically connected to each other, and in the other portion of the touch and display driver integrated assembly, the first conductive layer 3 is electrically connected to the SD line on the insulating layer. Because of configuration of the second protective layer 5, a jumper wire is prevented from being corroded, and because the first conductive layer 3 is electrically connected to the SD line or the gate electrode, a dual-line design is provided to solve problem of obstruction of signal transmission caused by break of one wire layer.

FIG. 4 shows a part of the touch and display driver integrated assembly. As shown in the figure, the gate electrode 11 and the SD line 13 are arranged and overlapped in a direction of layer stacking, which results in a rather big step section between the layers above the gate electrode 11 and the SD line 13, and the rather big step section is prone to cause fracture of the layer or the wires arranged on the same, reducing reliability of the device. In this embodiment, the first protective layer 2 covers the SD line 13 and the first sensing signal lines 4 are directly disposed on the first protective layer 2. As the thickness of the first protective layer 2 is increased, a contour of the first protective layer 2 at a position where the SD line 13 and the gate line 12 are overlapped does not have a sharp step section due to the overlap of the gate electrode 11 and the SD line 13 in the layer stacking direction, but is relatively flat, which makes the layer be not prone to break, and thus ensures other layers above the first protective layer 2 are not prone to breaking.

Figure 5:
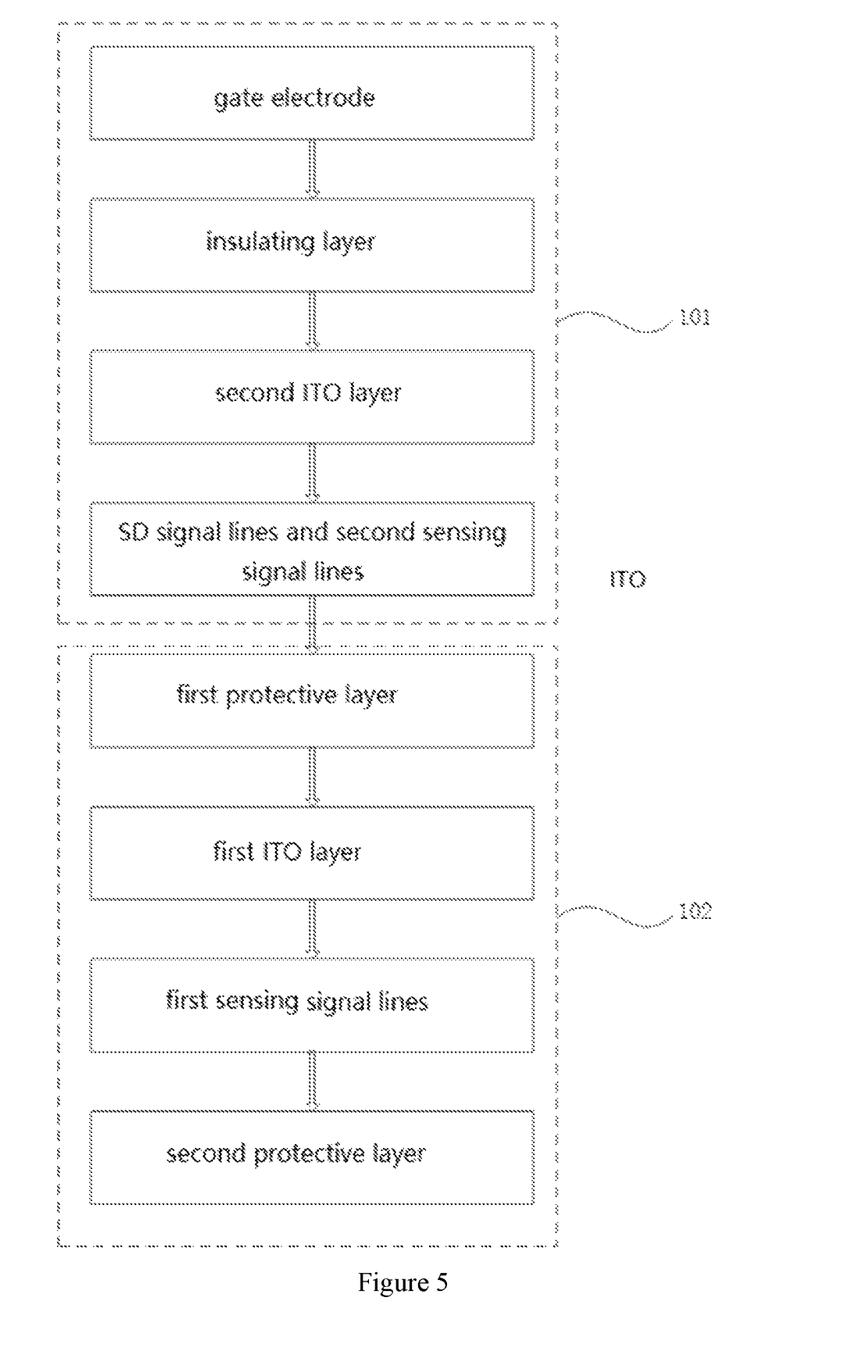
FIG. 5 is a flowchart of a method of manufacturing a touch and display driver integrated assembly according to an embodiment of the present disclosure.

As shown in FIG. 5, a method of manufacturing a touch and display driver integrated assembly according to an embodiment of the present disclosure includes:

a step 101 of providing a TFT structure layer on a substrate plate.

Specifically, the step of providing the TFT structure layer on the substrate plate can be directly performed by a conventional method for producing an array substrate, for example, a mask method is used for production.

Further, the step of providing the TFT structure layer on the substrate plate includes: sequentially providing a gate electrode 11, an insulating layer 12, and a second conductive layer on the substrate plate through a mask process, and providing a plurality of SD lines 13 and a plurality of second sensing signal lines 14 on an upper surface of the second conductive layer. The specific manner of providing the above layers may refer to a conventional method, which is not specifically limited in the present disclosure.

In step 102, a first protective layer, a first conductive layer, a plurality of first sensing signal lines, and a second protective layer are sequentially disposed on the TFT structure layer in a direction away from the substrate plate.

Specifically, the first protective layer may be a PVX protective layer, and a thickness thereof may refer to the thickness of the first protective layer in the embodiment given above. Similarly, the second protective layer may also be a PVX protective layer, and its thickness may also refer to the thickness of the second protective layer in the previous embodiments given herein.

In step 102, the providing a plurality of SD lines 13 and a plurality of second sensing signal lines 14 on an upper surface of the second conductive layer includes forming a metal layer on the second conductive layer, and forming the plurality of SD lines 13 and the plurality of second sensing signal lines 14 respectively through a single exposure process.

As for the touch and display driver integrated assembly produced by the above method, the surface of the TFT structure layer is covered or wrapped by the first protective layer, and then the first conductive layer and the plurality of first sensing signal lines are sequentially disposed on the first protective layer, and finally the second protective layer is provided on the outermost layer of the touch and display driver integrated assembly such that the touch and display driver integrated assembly of the above structure enables the surface of the first sensing signal lines and the first conductive layer to be covered by the second protective layer and also enables the via holes of the touch and display driver integrated assembly to be covered, so as to avoid the sensing signal lines, the first conductive layer and the via connection from contacting air, water vapor, etc. causing corrosion, and thus effectively extend the service life of the touch and display driver integrated assembly and make the touch and display driver integrated assembly suitable for more severe environments; the second protective layer can provide hermetic protection, and can also make the surface of the touch and display driver integrated assembly gentler; further, the second protective layer may be a PVX protective layer, that is, have a certain elasticity, such that the touch and display driver integrated assembly may have a certain shock resistance and a certain anti-collision performance; in addition, the first conductive layer and the first sensing signal line are arranged adjacently, so that the first conductive layer is directly connected to the first sensing signal line, which eliminates the need for a via connection, and thus eliminates one step for production, effectively saves production costs and increases production efficiency.

An electronic apparatus according to a third embodiment of the present disclosure includes: a touch and display driver integrated assembly. As shown in FIGS. 1-4, the touch and display driver integrated assembly includes: a TFT structure layer 1 provided on a substrate plate; a first protective layer 2, a first conductive layer 3, a plurality of first sensing signal lines 4, and a second protective layer 5 sequentially disposed above the TFT structure layer 1; wherein the plurality of first sensing signal lines 4 are on an upper surface of the first conductive layer 3; the second protective layer 5 covers a surface formed by the first sensing signal line 4 and the first conductive layer 3.

Specifically, the touch and display driver integrated assembly described in the third embodiment may directly use the touch and display driver integrated assembly provided in the first embodiment, and its specific implementation structure can refer to the related contents described in the first embodiment and will not be repeated here.

In the technical solution of the present disclosure, the surface of the TFT structure layer of the touch and display driver integrated assembly is covered by the first protective layer, and then the first conductive layer and the plurality of first sensing signal lines are sequentially disposed on the first protective layer, and finally the second protection layer is provided on the outermost layer of the touch and display driver integrated assembly such that the touch and display driver integrated assembly of the above structure enables the surface of the first sensing signal lines and the first conductive layer to be covered by providing the second protection layer, and enables the via holes of the touch and display driver integrated assembly to be covered so as to avoid the first sensing signal lines, the first conductive layer, and the via hole connections from contacting air, water vapor, etc., which causes corrosion, and thus effectively extend the service life of the touch and display driver integrated assembly and make the touch and display driver integrated assembly suitable for more severe environments; the second protective layer can provide hermetic protection, and can also make the surface of the touch and display driver integrated assembly gentler; further, the second protective layer may be a PVX protective layer, that is, have a certain elasticity, such that the touch and display driver integrated assembly may have a certain shock resistance and a certain anti-collision performance; in addition, the first conductive layer and the first sensing signal line are arranged adjacently, so that the first conductive layer is directly connected to the first sensing signal line, which eliminates the need for a via connection, and thus eliminates one step for production, effectively saves production costs and increases production efficiency.

The above are only the preferred embodiments of the present disclosure, and are not intended to limit the present disclosure in any form. Any simple modifications, equivalent changes, and trims made to the above embodiments based on the essential technical schemes of the present disclosure still belong to the scope of the disclosed technical solution.

The invention claimed is:

1. A touch and display driver integrated assembly, comprising:
   a thin film transistor structure layer on a substrate plate;
   a first protective layer covering the thin film transistor structure layer;
   a first conductive layer located on a side of the first protective layer facing away from the thin film transistor structure layer, wherein the first conductive layer contacts a surface of the first protective layer facing away from the thin film transistor structure layer;
   a plurality of first sensing signal lines on a side of the first conductive layer facing away from the first protective layer; and
   a second protective layer on a side of the first sensing signal lines and the first conductive layer facing away from the thin film transistor structure layer, wherein the second protective layer covers both the first conductive layer and the plurality of first sensing signal lines.

2. The touch and display driver integrated assembly as claimed in claim 1, wherein the plurality of first sensing signal lines are in direct contact with the first conductive layer to achieve electrical connection.

3. The touch and display driver integrated assembly as claimed in claim 1, wherein the thin film transistor structure layer comprises:
   a plurality of thin film transistor structures arranged in an array;
   the thin film transistor structure includes a gate electrode, an insulating layer, a second conductive layer, which are sequentially stacked on the substrate plate in a direction away from the substrate plate, and a plurality of source-drain signal lines and a plurality of second sensing signal lines on a surface of the second conductive layer facing away from the substrate plate.

4. The touch and display driver integrated assembly as claimed in claim 3, wherein the first conductive layer is connected to the plurality of second sensing signal lines respectively through via holes.

5. The touch and display driver integrated assembly as claimed in claim 3, wherein
   the first conductive layer is electrically connected to the source-drain signal lines or a gate line through via holes.

6. The touch and display driver integrated assembly as claimed in claim 3, wherein the first conductive layer and the second conductive layer are indium tin oxide (ITO) layers.

7. The touch and display driver integrated assembly as claimed in claim 3, wherein the first conductive layer, together with the second conductive layer in the thin film transistor structure, serves as a capacitor structure for storage of electrons.

8. The touch and display driver integrated assembly as claimed in claim 1, wherein the first protective layer is a PVX protective layer, and a thickness of the first protective layer is in the range of 4000-7000 Angstroms.

9. The touch and display driver integrated assembly as claimed in claim 8, wherein
   the thickness of the first protective layer is 6000 Angstroms.

10. The touch and display driver integrated assembly as claimed in claim 1, wherein the second protective layer is a PVX protective layer, and a thickness of the second protective layer is in the range of 2000-4000 Angstroms.

11. The touch and display driver integrated assembly as claimed in claim 10, wherein
    the thickness of the second protective layer is 2500 angstroms.

12. An electronic apparatus comprising:
    the touch and display driver integrated assembly as claimed in claim 1.

13. The touch and display driver integrated assembly as claimed in claim 1, wherein the first sensing signal lines are arranged on and do not entirely cover a surface of the side of the first conductive layer facing away from the first protective layer, and have a predetermined pattern.

14. The touch and display driver integrated assembly as claimed in claim 1, wherein a thickness of the first protective layer is configured such that a substantially planar surface of the protective layer is provided for the first conductive layer on the first protective layer.

15. The touch and display driver integrated assembly as claimed in claim 1, wherein the second protective layer covers the entire surface of the touch and display driver integrated assembly, including via holes on the surface of the touch and display driver integrated assembly.

16. A method of manufacturing a touch and display driver integrated assembly, the method comprising:
    providing a thin film transistor structure layer on a substrate plate;
    providing a first protective layer on the thin film transistor structure layer to cover the thin film transistor structure layer;
    forming a first conductive layer on the first protective layer, wherein the first conductive layer contacts a surface of the first protective layer facing away from the thin film transistor structure layer;

forming a plurality of first sensing signal lines on the first conductive layer; and forming a second protective layer on a side of the first sensing signal lines and the first conductive layer facing away from the thin film transistor structure layer, so that the second protective layer covers both the first conductive layer and the plurality of first sensing signal lines.

17. The method as claimed in claim 16, wherein the providing a thin film transistor structure layer on a substrate plate comprises:

sequentially providing a gate electrode, an insulating layer, and a second conductive layer on the substrate plate, and providing a plurality of source-drain signal lines and a plurality of second sensing signal lines on a side of the second conductive layer facing away from the insulating layer, through a mask process.

18. The method as claimed in claim 17, wherein the providing a plurality of source-drain signal lines and a plurality of second sensing signal lines on a side of the second conductive layer facing away from the insulating layer comprises: forming a metal layer on the side of the second conductive layer facing away from the insulating layer, and forming the plurality of source-drain signal lines and the plurality of second sensing signal lines through a single exposure process.

19. The method as claimed in claim 16, wherein the first sensing signal lines are arranged on and do not cover entirely the surface of the side of the first conductive layer facing away from the first protective layer and have a predetermined pattern.

20. The method as claimed in claim 16, wherein a thickness of the first protective layer is configured such that a substantially planar surface of the protective layer is provided for the first conductive layer on the first protective layer.

* * * * *